UNITED STATES PATENT OFFICE.

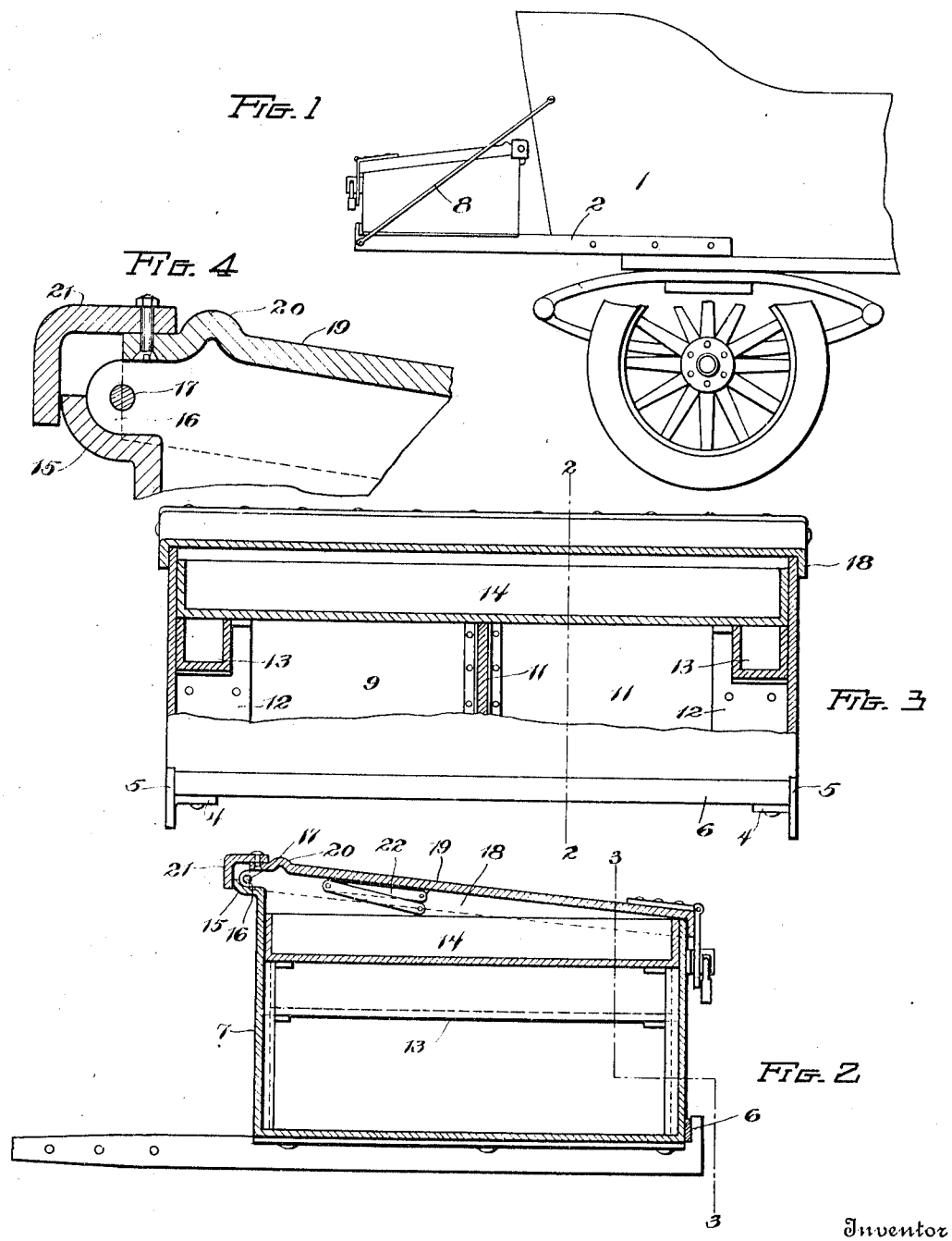

JAMES M. PRITCHETT, OF VINCENNES, INDIANA, ASSIGNOR OF ONE-HALF TO JAMES V. SMITH, OF VINCENNES, INDIANA.

AUTOMOBILE-TRUNK.

1,035,048.  Specification of Letters Patent.  Patented Aug. 6, 1912.

Application filed December 2, 1911. Serial No. 663,492.

*To all whom it may concern:*

Be it known that I, JAMES M. PRITCHETT, a citizen of the United States, residing at Vincennes, in the county of Knox and State of Indiana, have invented new and useful Improvements in Automobile-Trunks, of which the following is a specification.

This invention relates to automobile trunks and the principal object of the invention is to provide a simple and efficient device of this character having means for effectually preventing dust, dirt or rain from entering the trunk and also means whereby tool trays therein are covered by an auxiliary tray which prevents the escape of tools from the tray.

A further object of the invention is the provision of a simple and efficient support for the trunk which may be readily attached to automobiles of different makes.

Further objects of this invention will appear as the following specific description is read in connection with the accompanying drawing, which forms a part of this application, and in which:—

Figure 1 is a detail side elevation of an automobile showing the trunk in position thereon. Fig. 2 is a vertical transverse section through the trunk taken on the line 2—2 of Fig. 3. Fig. 3 is a vertical longitudinal section taken on the line 3—3 of Fig. 2. Fig. 4 is an enlarged detail sectional view showing the hinged connection of the lid and the box.

Referring more particularly to the drawing, 1 represents the body of an ordinary automobile or motor vehicle to each side of which is secured a supporting bar 2. These supporting bars are extended rearwardly from the back of the automobile body and having horizontal flanges 4 bent up from between their ends and leaving a vertical extension 5 at the end of the bars against which a cross connecting strip 6 is adapted to abut. This cross strip 6 forms an abutment for the forward portion of the trunk 7 which is preferably bolted to the flanges. The strip 6 is secured in any suitable manner to the bars 2 and the outer end of the bars have connected thereto supporting cables or rods 8 whose opposite ends are connected to the body of the vehicle adjacent the top thereof.

The trunk 7 comprises a body which is divided into separate compartments 9 and 10 by means of a removable central partition 11. Mounted within the compartments 9 and 10 are suitable supports 12 upon which tool boxes or trays 13 are mounted, the upper end of the tool boxes being open and covered by a tray 14 which rests thereon and upon the partition 11. The side of the trunk adjacent the automobile is provided at its upper end with an outwardly and upwardly curved extension 15 and lying within the recess 16 formed by said extension is a hinging rod 17 which extends entirely across the trunk through the ends thereof and projects sufficiently far to extend through the depending flanges 18 on the ends of the lid 19. These flanges extend around the front of the lid and overhang the box to prevent dust or other foreign matter from entering the trunk, the top being inclined so as to shed rain. Adjacent the rear edge of the top, the same is provided with a raised rib 20 and secured to the top immediately in the rear of the raised rib is an L- or V-shaped member 21 which overhangs the outwardly and upwardly curved flange 15 and works thereover when the lid is raised. The lid is held in raised position by toggle levers 22 as is customary and is held in closed position by a lock of any preferable construction.

What I claim as new is:—

1. An automobile trunk comprising a receptacle having an inclined upper edge, a flanged lid mounted on the receptacle, an outwardly and upwardly extending flange on the receptacle, a rod lying in the recess formed by said flange, said rod passing through the flanges of the lid to pivotally connect the lid to the receptacle, a raised rib on the lid adjacent its rear end, and an L-shaped dust guard secured to the lid in the rear of the rib and adapted to operate over said outwardly and upwardly extending flange.

2. An automobile trunk comprising a receptacle having an inclined upper edge, a flanged lid mounted on the receptacle, an outwardly and upwardly extending flange on the receptacle, means to pivotally connect the lid to the receptacle, and an L-shaped dust guard secured to the lid and adapted to operate over said outwardly and upwardly extending flange.

In testimony whereof I affix my signature in presence of two witnesses.

JAMES M. PRITCHETT.

Witnesses:
 CHARLES G. McCORD,
 FANNIE GRAETER.